Figure 1:
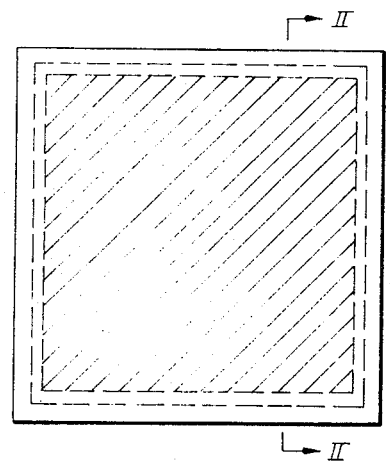

OR 3,846,015

United States

Moi

[11] 3,846,015
[5] Nov. 5, 1974

[54] LIQUID CRYSTAL DISPLAY DEVICE
[75] Inventor: Manfred Edvin Moi, Kristiansand, Norway
[73] Assignee: Norstron Electro-Optic Systems, Ltd., Kristiansand, Norway
[22] Filed: Mar. 6, 1973
[21] Appl. No.: 338,517

[30] Foreign Application Priority Data
 Mar. 7, 1972  Norway.................................. 713/72

[52] U.S. Cl. ........................................... 350/160 LC
[51] Int. Cl. ............................................... G02f 1/16
[58] Field of Search................................ 350/160 LC

[56] References Cited
UNITED STATES PATENTS
3,597,044  8/1971  Castellano .......................... 350/160

*Primary Examiner*—Edward S. Bauer
*Assistant Examiner*—Matthew W. Koren
*Attorney, Agent, or Firm*—Stevens, Davis, Miller & Mosher

[57] ABSTRACT

According to the invention there is provided a liquid crystal display device comprising a pair of parallel, transparent plates with associated electrode configurations and between which there is enclosed a liquid crystal layer by means of a gasket or seal around the edges of the plates. The construction of the seal is such that it provides a flexible joining of the plates with a bellows-like effect. The seal comprises inner and outer portions which are hermetically sealed to the respective plates and are joined by way of a flexible transition portion, the extension of the respective plates corresponding to the adjacent inner and outer portions of the seal. The seal, together with a number of wafers for the sealing of lead-in holes for electrical connection to external leads, are secured to the plates by means of a special method which according to the invention comprises a combination of heat, ultrasound and mechanical pressure under the influence of an electric voltage.

4 Claims, 21 Drawing Figures

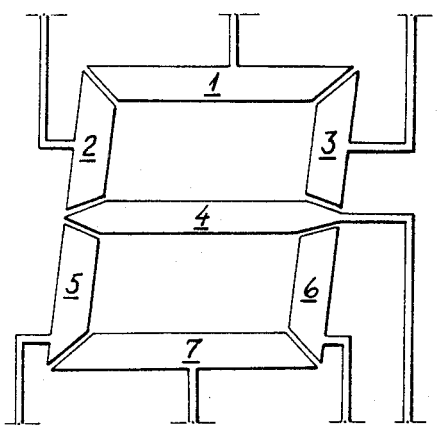
FIG. 6
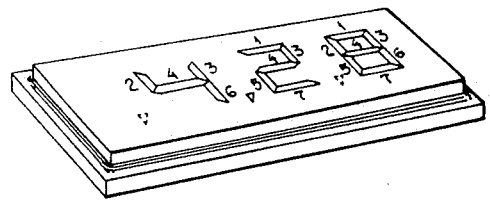
FIG. 7
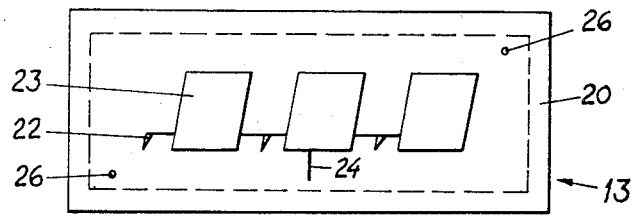   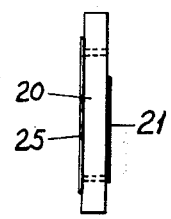
FIG. 8a        FIG. 8b
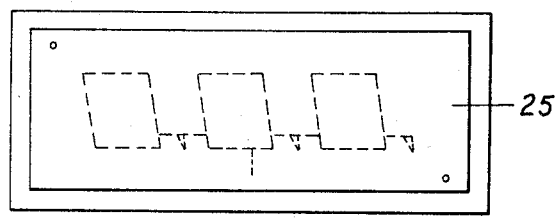
FIG. 8c

LIQUID CRYSTAL DISPLAY DEVICE

This invention relates to a liquid crystal display device, comprising a pair of parallel transparent plates which are provided with respective electrode configurations including a number of elements which are connected to external leads, and a liquid crystal layer which is enclosed between the plates by means of a seal arranged along the edges of the plates, and wherein an electric voltage may be applied to desired electrode elements so that corresponding portions of the liquid crystal are activated for the display of e.g., graphical symbols in stationary and/or transient form. Further the invention relates to a method of making the disclosed display device.

Display devices based on application of liquid crystals as active elements are previously known. Any essential application and commercial utilization of the liquid crystal material in such devices has, however, not taken place. This is due to essential constructional problems because the liquid crystal material is relatively active with respect to reaction and therefore difficult to handle and assemble. Further it has been very dfficult to achieve sufficiently long life-time for the material for use in such display devices.

The liquid crystal material can be utilized on a variety of areas within the electro-optic branch. In practical utilization of the electro-optic properties of this material the liquid crystal will usually be hermetically enclosed in a thin layer between e.g., a pair of glass plates, whereby the surfaces of the glass plates facing the liquid crystal layer, are covered with a reflecting metallic film and a transparent metal oxide film, respectively. These films have a conductivity per unit of area which is many times higher than that of the liquid crystal layer. The liquid crystal layer is normally in a transparent or clear state. If a sufficiently high electric voltage (approximately 30 V) is applied to the layer by way of the metal and metal oxide films, the layer is activated and changed from clear state to a milk-white, light-refracting and reflecting state which may be viewed through the oxide film and the respective glass plate.

The activation occurs partly by ionization and partly by capacitive coupling. The strength of the light refractions or the reflection is in proportional relation to the incident light.

A very important problem by the development of this principal construction has been to arrive at a suitable seal for the joining of said glass plates around the side edges of the plate, so that the plates will have a constant distance of approximately 13 $\mu$ from each other and so that there is formed a hermetically sealed space for the liquid crystal material. Simultaneously the sealing construction must be of such a quality that reactions between the liquid crystal material and the sealing material are avoided, that the sealing material is secured to the glass plates in such a way that the liquid crystal is not disturbed either chemically or mechanically, that the seal makes it possible for the liquid crystal to expand by possible heat variations or mechanical variations and simultaneously prevents leakage of air into the liquid crystal by this expansions, and that the sealing material contributes to maintain as uniform a thickness as possible of the liquid crystal layer without any risk for electrical short circuit between the electrode forming metal and metal oxide film. Many types of material have been tried for this sealing purpose, and of these may be mentioned glass frit seals and different types of plastic seals. All these known seals have however, suffered from serious drawbacks because of the above mentioned problems, and also because of another important problem, namely the forming of bubbles in the liquid crystal layer, which bubbles may either appear during the assembly or be formed after the assembly. Such bubbles are very unwanted, as they constitute a bare spot in the liquid crystal layer which is not activated by the voltage application. Thus a bubble will appear as a dark spot with sharp edges (contrast) corresponding to the extent of the bubble.

The object of the present invention is to provide a display device of the type set forth above, in which there is provided a flexible sealing arrangement and in which the seal is very strongly bonded to the transparent plates.

A further object of the invention is to provide a liquid crystal display device in which the construction is such that there is acieved an easy assembly and a long life-time of the liquid crystal material.

A still further object is to provide a method of making a liquid crystal display device by which the above mentioned drawbacks are avoided.

The liquid crystal display device according to the invention is characterized in that the seal comprises inner and outer portions which are joined by way of a flexible transition portion, and are hermetically secured to the border areas of the respective plates, the extension of the respective plate corresponding to the adjacent inner and outer portions of the seal, and the plates in assembled position being held a distance apart equal to the thickness of the inner portion of the seal.

In one embodiment of the invention the external leads are connected to the electrode configurations by way of metallized holes which are arranged in one of the plates and which are tightened by means of electrically conducting wafers with the same thickness as the inner portion of the seal, the wafers being placed over the holes and tightly secured to said plate.

The invention also provides a method of making the display device set forth above, in which the plates are glass plates which are provided with respective evaporated electrode configurations. The method according to the invention is characterized in that the seal and the sealing wafers are secured to the glass plate having metallized holes, by application of a combination of heat, ultra-sound and mechanical pressure under the influence of an electric voltage, that the seal is subsequently secured to the other glass plate by means of the same securing method, that the space between the plates is filled with liquid crystal substance through a number of filling holes arranged in one of the plates, whereafter the glass plates are pressed against each other for the achievement of a crystal layer thickness equal to the thickness of the inner sealing portion, and that the filling holes are thereafter tightened.

The preferred embodiment of the display device according to the invention has a wide variety of application possibilities. Of these may be mentioned data machines, office machines, measuring instruments, warning and indication signs, erasable remotely controlled signs, radio and television, communication, telephone services, navigation, instruction, numerical control etc.

Figure 2:
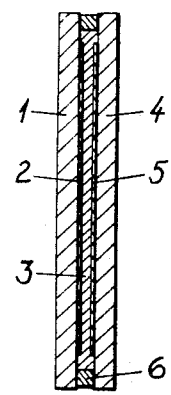
Figure 3:
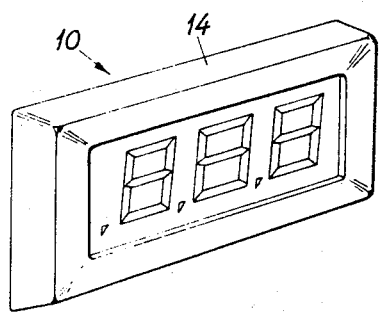
Figure 4:
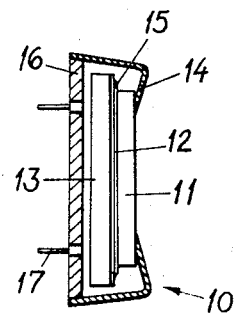
Figure 5:
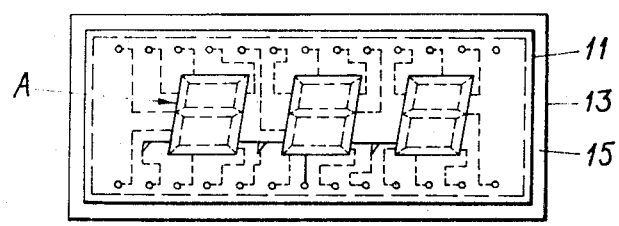
Figures 9A, 9B:
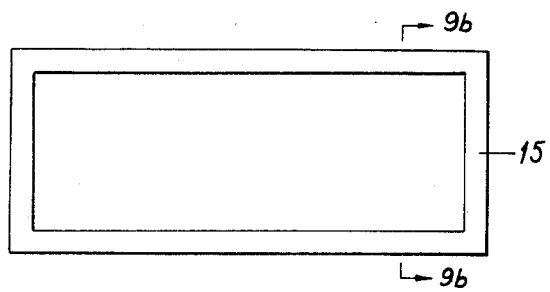
Figures 10A, 10B:
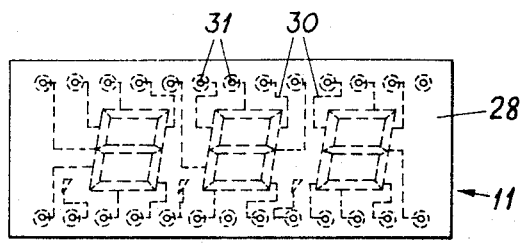
Figure 10C:
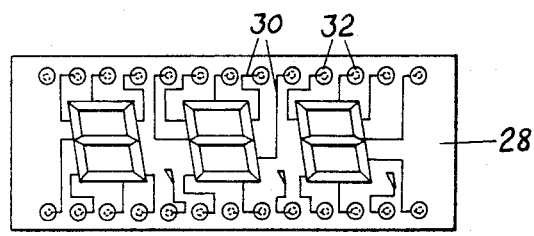
Figures 11A, 11B:
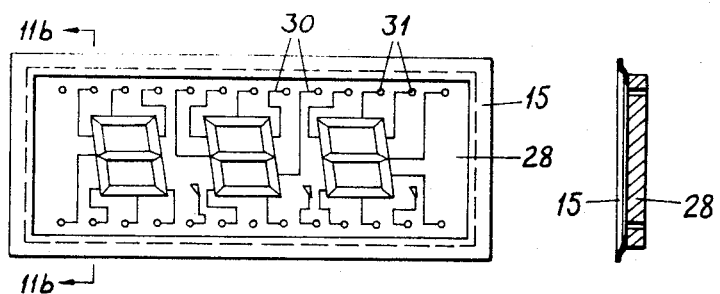
Figure 11C:
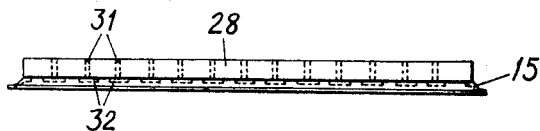
Figure 11D:
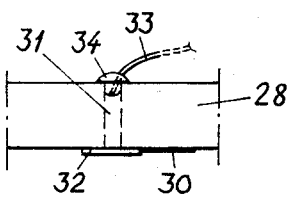
Figure 11E:
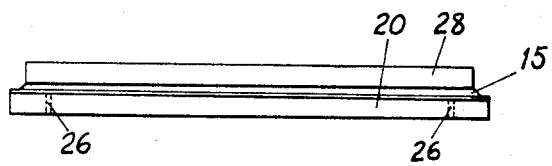
Figure 11F:
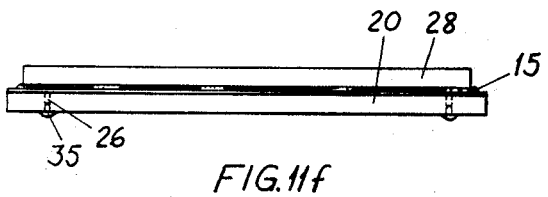

An embodiment of the invention will now be described by way of example with reference to the accompanying drawings, in which FIGS. 1 and 2 show a principal liquid crystal assembly, FIG. 3 is a perspective view of a numerical display panel according to the invention, FIG. 4 is a partly sectioned side view of the panel of FIG. 3, FIG. 5 is a front view of the plate assembly in the panel of FIGS. 3 - 4, in which the outlines of the electrode films are suggested, FIG. 6 is a view of the figure-forming pattern of the metal oxide segments of the cathode, FIG. 7 is a perspective view of the device in which the number "4, 28" is reflected by way of the liquid crystal material, FIGS. 8a-c, 9a-b and 10a-c show different projections of the individual parts which are included in the figure panel, FIGS. 11a-c show the cathode glass with applied seal seen from behind and from the short and long sides, FIG. 11d shows an enlarged detail of FIG. 11c, and FIGS. 11e-f show the assembled panel construction before and after the compression of the glass plates.

In FIGS. 1 and 2 is shown the principal structure of a liquid crystal assembly of the type which is used in connection with the invention. FIG. 2 is a section along the line II — II in FIG. 1 and shows a glass plate 1 with an applied, reflecting metal film 2, a glass plate 4 with an applied, transparent metal oxide film 5 and a liquid crystal layer 3 which is enclosed between the glass plates by means of a seal 6 which is secured to the glass plates along the edges thereof. In the following the glass plate 1 with the metal film 2 is described as the "anode glass," and the glass plate 5 with the metal oxide film is described as the "cathode glass." Thus the metal film is regarded as anode and the metal oxide film as cathode. When a suitable voltage is applied to the electrodes as described above, the liquid crystal is activated uniformly if the thickness of the layer is constant. In this case the activated surface is constituted by the hatched area in FIG. 1.

In FIGS. 3 - 5 is shown an embodiment of the display device according to the invention. As shown in FIG. 3, the device comprises a numeric panel 10 with three figures and with a comma placed to the left of each figure. FIG. 4 shows a side view of the plate assembly of the panel 10 in FIG. 3 in which the plastic cover 14 and the base plate of the panel is sectioned. As shown the panel further includes a cathode glass 11, a liquid crystal layer 12 and an anode glass 13, a gasket or seal 15 and a number of contact pins 17 which are mounted in the base plate 16 for plugging into a suitable socket device. FIG. 5 shows a front view of the plate assembly of the panel, and shows the cathode glass 11, the anode glass 13 and the seal 15. In the Figure the outlines of the electrode film are suggested, as the anode outline A is shown with solid lines, and the figure-forming patterns of the cathode segments are shown with phantom lines. Further are shown 26 holes which by way of suggested conductors are connected to the cathode segments and to the anode such as more closely described below.

FIG. 6 shows the figure-forming pattern of the metal oxide segments of the cathode, and as shown each figure or numeral in the panel consists of seven segments which together form a configuration similarly to the FIG. "8." The segments are mutually isolated and connected to separate conductors.

FIG. 7 shows a perspective drawing of an assembled glass panel in which the number "4, 28" is reflected through the liquid crystal of the panel. The FIG. "8" shows that all the seven segments in the figure-of-8 configuration are activated. The FIG. "2" appears thereby that the segments 1, 3, 4, 5, 7 are activated, and the FIG. "4" thereby that the segments 2, 3, 4, 6 are activated. Each of the segments in the panel and each of the three commas may be activated individually.

With the described panel one is able to display any number between 0.001 and 999. With the stated geometrical structure of the panel and with its features and special properties which are to be described more closely below, one will be able to obtain, compose and put together more complicated numbers, and more or fewer figures and other forms of visual reproduction of graphical nature. Thus also figurative displays in stationary form or in transient form may be obtained by means of screen or grid-like electrodes. With these electrodes fixed to said electrode or cathode glass and with the liquid crystal layer situated close to the electrodes under influence of electric signals from suitable drivers, such as electronic pulse generators or coding or decoding systems, the mentioned visual numerical counting or picture displays may be produced through the transparent cathode glass of the panels.

In FIGS. 8 - 10 are shown different projections of the individual parts included in the displayed panel according to the invention. In FIGS. 8a-8c the anode glass 13 is shown in front view, sideview and rear view, respectively. The reflecting anode is here constituted by a clear glass plate 20 on one surface of which there is evaporated a continuous, reflecting metal film 21 which, as shown in FIG. 8a, forms three triangles 22 to the left of respective oblique-angled rectangles 23. These six surfaces are electrically connected to each other and are connected to a conductor 24. On the opposite side of the glass plate 20 in relation to the metal film 21 a metallic reflector 25 is deposited by evaporation. This metal reflector is provided to further improve the contrast by display of figures on the panel. Further the glass plate is provided with a pair of diagonally arranged holes 26. These holes are used for filling of the liquid crystal material such as described below.

The seal 15 according to the invention is in FIG. 9a shown in plan view and is in FIG. 9b shown in section along the line 9b–9b in FIG. 9a. The material is a surface-treated sealing material which is suitable for the purpose. According to the invention the seal has such a cross sectional form and is secured to each of the glass plates in such a way that there is achieved a bellows-like joining or connection. The material which is used in the seal, has been tested thouroughly and experimented out because of the reaction activity of the liquid crystal. One has found that aluminium with a degree of fineness better than 99.99 percent is very suitable for use as sealing material. Thus the seal 15 is made of aluminium foil with a thickness of 13 $\mu$, as is then also achieved a spacing of 13 $\mu$ between the glass plates, and this is the most favorable thickness of the liquid crystal layer. The aluminium seal in FIG. 9a is punched or died to a form along all four edges so that it has the cross section shown in FIG. 9b. Thus the seal has a longitudinally extending ridge 27 so that the inner portion of the seal is somewhat displaced or offset in relation to the outer portion. When the seal is then secured to the anode and cathode glass, the spacing between the glass plates becomes larger than the thickness of the seal because of the ridge 27, and after attachment on the plates and compression and pressing together of the assembly the seal gets a bellows-like effect.

In FIGS. 10a – 10c the cathode glass 11 is shown in front view, side view and rear view, respectively. On the back of the glass plate 28 there is as shown, deposited cathodes 29 in the form of a number of mutually isolated metal oxide film segments and commas. These segments form the three previously mentioned seven-segment figures. The segments and commas are connected to associated conductors 30 which are also constituted by deposited metal oxide. As mentioned in connection with FIG. 5, the glass plate 28 is provided with 26 throughgoing holes 31, and by means of a special arrangement these holes form electrical lead-in through the glass plate and connection between external leads and the conductors 30 together with the conductor 24 of the anode glass. In this contact arrangement are included a number of aluminium wafers 32 which are also used for tightening of the holes 31, as described in connection with FIG. 11.

Each of the oblique-angled rectangles 23 on the anode glass 13 corresponds accurately to the outline of each figure "eight" in FIG. 10, and each comma on the glass plates 11 and 13 corresponds in the same way. As the electric conductors 30 and the respective segments and commas of the conductors on the cathode glass comprise the same material, also the conductors 30 would be visible in the course of the activation of the liquid crystal material if the reflecting anode had the entire anode glass covered such as shown in FIG. 1. Such lines are, however, very undesirable and would disturb the total impression of the reflecting figures and commas. It is therefore necessary that only the selected segments and commas are reproduced during the activation. This is achieved by the shown arrangement, since only those surfaces are activated where the metal oxide segments and the commas on the cathode glass 11 exactly correspond with the reflecting anode of the anode glass 13, such as shown in FIG. 5.

In the following the method of making the display device according to the invention will be described with reference to FIGS. 11a –11f. In FIGS. 11a – 11c the cathode glass 28 of the device with its applied seal 15 is shown as viewed from the rear side and from the short and long side. It is here started from a glass plate which is provided with cathode pattern conductors 30 and leading-through holes 31. It will be understood that these holes are necessary for the provision of contact to the external supply circuits, since the used gasket or seal 15 is made of a conductive material, so that the conductors 30 can not be taken directly outwards through the sealing material.

As the first step by the assembly the aluminium seal 15 is fixed with one surface to the border area of the cathode glass 28 by means of a combination of heat, mechanical pressure and ultrasound under influence of an electric voltage. This securing or bonding method gives a sealing connection which is mechanically strong and completely hermetically tight. Thereafter the same securing method is used in order to secure the aluminium discs or wafers 32 to the glass, whereby the wafers are placed over the holes 31 such as indicated in FIG. 11c. When the holes of the cathode glass are sealed in this way, the other surface of the seal 15 is secured or bonded to the anode glass 20 by means of said securing method, such as shown in FIG. 11e. As shown the length and width of the anode glass is somewhat larger than that of the cathode glass, in accordance with the adjacent surface portion of the seal. The assembly is now ready for filling of liquid crystal material, and this is effected through the filling holes 26 of the anode glass. After the filling of the liquid crystal the glass plates 20 and 28 are pressed together to a mutual spacing which is determined by the thickness of the seal 15 and the wafers 32. The seal and wafers have the same thickness equal to 13 $\mu$, and after the compression the liquid crystal thus has the desired thickness of approximately 13 $\mu$. After the compression of the glass plates the filling holes 26 are sealed, and the finished assembly is shown in FIG. 11f. The filling holes 26 are tightened or sealed by use of very pure indium material 35 which is bonded to the glass by means of ultra-sound in combination with moderate heat. (The metal reflector 25 is accordingly removed from the bonding area around the holes 26).

The complete contact arrangement for the holes 31 is shown in FIG. 11d which shows an enlarged detail of FIG. 11c. The holes 31 are metallized, i.e. the inner surfaces of the holes are covered by conductive metal, e.g., silver paint. One end of a thin conductor 33, e.g., of copper, is fixed to the outer end of each hole (except the upper left hole in FIG. 11a which is not utilized). The conductors are fixed to the holes by means of ultrasound welded indium 34. From the conductors 30 there is consequently achieved contact to the external leads 33 through the wafers 32 and the metal layer in the holes 31. The leads 33 are in a not specifically shown way connected to the associated contact or socket pins 17 in FIG. 3.

When the glass plates 20 and 28 are moved together to the final mounting position (FIG. 11f), there is also achieved contact between the anode conductor 24 (FIG. 8a) and that aluminium wafer which is secured to the cathode glass 28 opposite to this conductor. In order to insure stable contact to the conductor 24, a spring (not shown) may be placed in the respective hole 31 in order to press the associated wafer 32 against the conductor by possible expansions of the liquid crystal.

In the described arrangement in which the seal 15 is utilized, a number of advantages are achieved. The liquid crystal material can be inserted into the panel through the filling holes 26 without any risk for formation of bubbles, as possible bubbles will disappear by the compression of the glass plates. The desired thickness of the liquid crystal layer is achieved automatically when the cathode glass is pressed against the anode glass, as the seal 15 and the wafers 32 have the desired thickness (13 $\mu$). The relatively thin seal acts as a flexible bellows, so that the liquid crystal material can "work" without risk for the formation of fractures or leakage of air. The risk for short circuit between the electrode layers is eliminated since the glass plates 20 and 28 are held together by means of the capillary action of the liquid crystal. The thin aluminium material on the respective glass plates follows expansions and compressions of the glass by possible heat variations, without any risk for the occurrence of fractures or leakage. Finally the form of the seal prevents the occurrence of any lateral displacement of the cathode pattern in relation to the anode after the compression of the anode and cathode glasses, even under strong mechanical shocks.

I claim:

1. In a liquid crystal display device, comprising a liquid crystal layer enclosed between a pair of parallel transparent plates by means of a seal along the plate edges with the plate surfaces facing the liquid crystal layer being provided with respective electrode configurations in the form of a number of elements electrically connected to external leads for selectively applying an electric voltage so that corresponding parts of the liquid crystal are activated for display of symbols, the seal comprises inner and outer portions which are joined by way of a flexible transition portion and are hermetically secured to the border areas of the respective plates, the size of the respective plates corresponding essentially to the size of the adjacent inner and outer portion of the seal, and at least one transparent plate defines a plurality of holes provided for the external leads which holes are sealed by means of electrically conducting wafers placed between the plates over the respective holes.

2. The display device according to claim 1, wherein the seal consists of aluminum foil with a degree of fineness better than 99.99 percent.

3. The display device according to claim 1, wherein the walls of said holes are metallized.

4. The display device of claim 1, wherein the wafers have the same thickness as the inner seal portion.

* * * * *